UNITED STATES PATENT OFFICE.

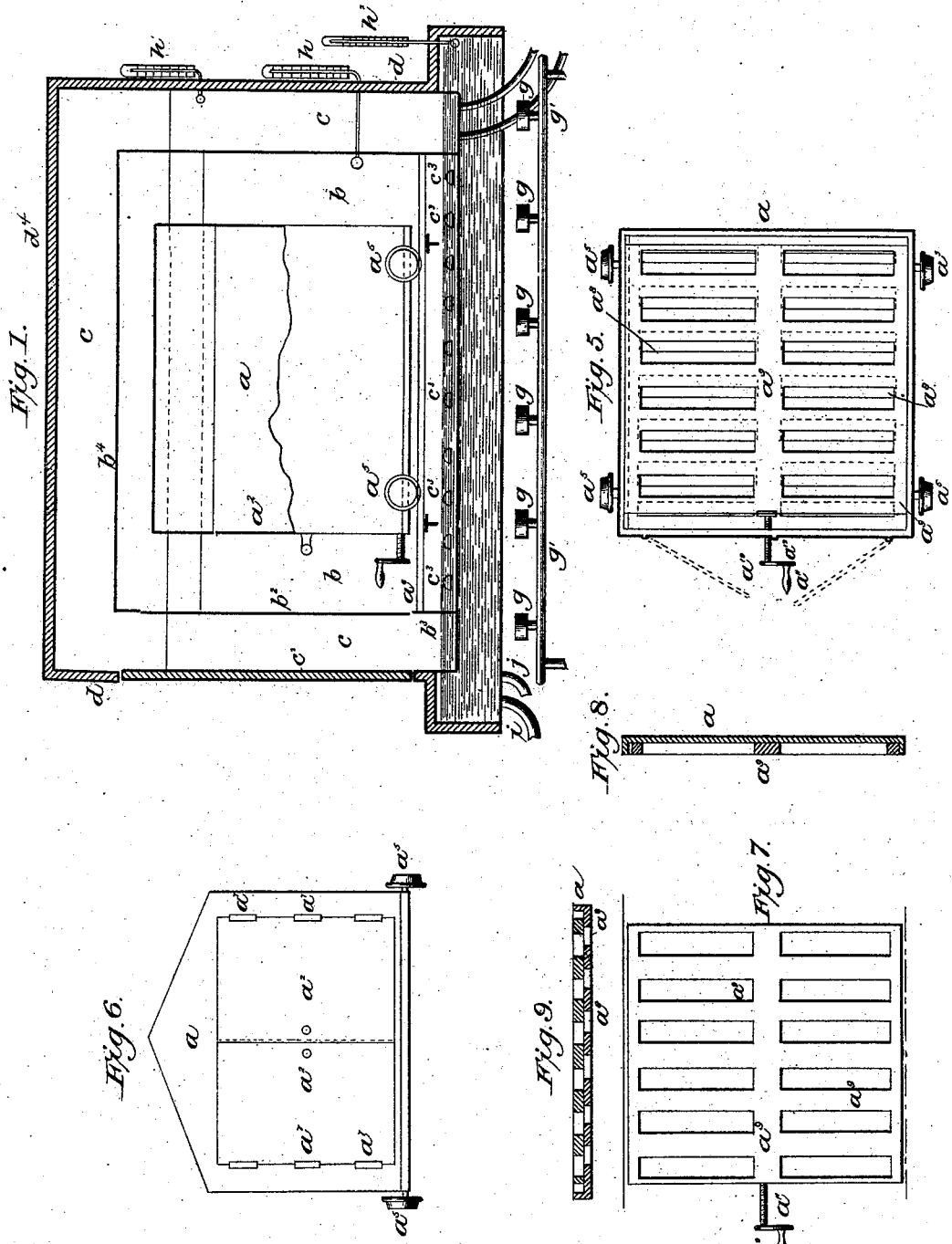

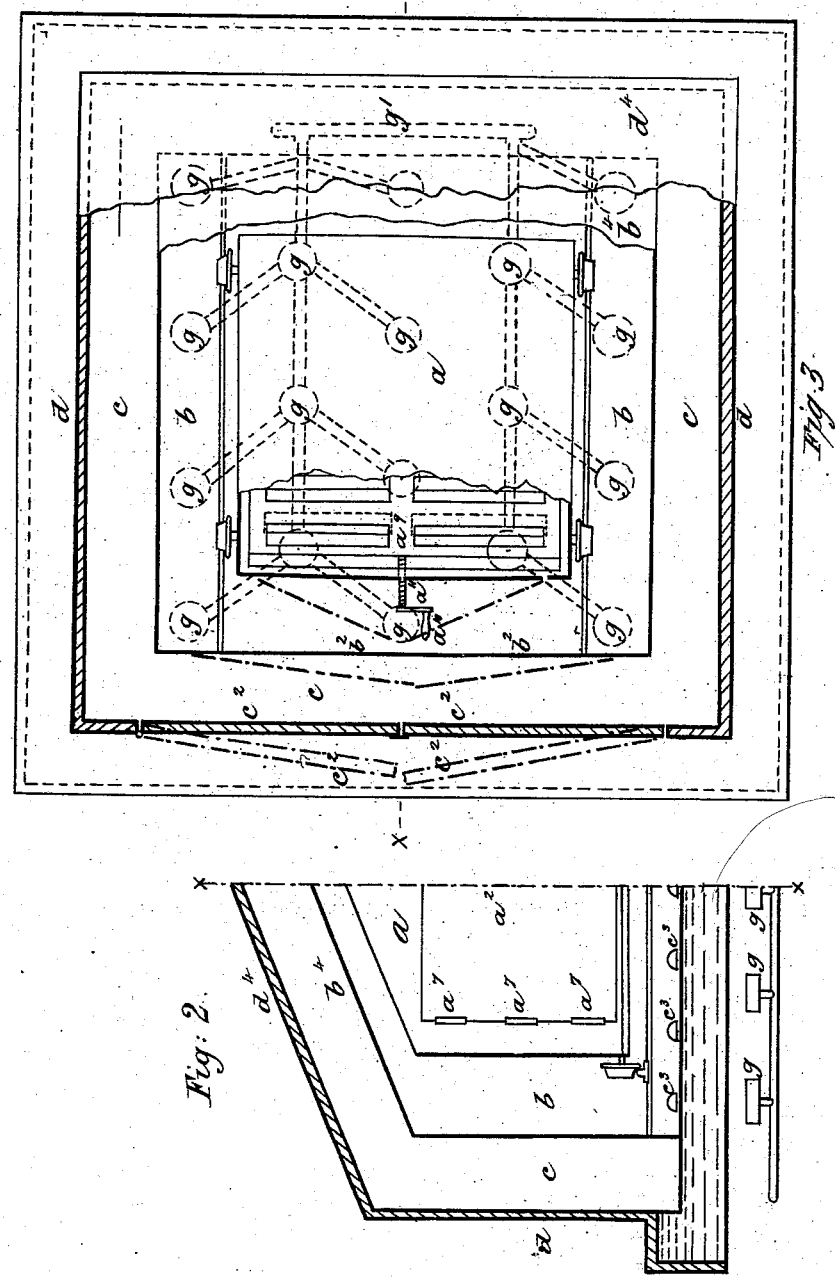

GEORGE HAND SMITH, OF CHELSEA, COUNTY OF MIDDLESEX, ENGLAND.

APPARATUS FOR PRODUCING COLORS OR DESIGNS ON SURFACES.

SPECIFICATION forming part of Letters Patent No. 292,220, dated January 22, 1884.

Application filed August 20, 1883. (No model.)

*To all whom it may concern:*

Be it known that I, GEORGE HAND SMITH, of Rochester, in the county of Monroe, in the State of New York, but temporarily residing at Chelsea, in the county of Middlesex, England, doctor of medicine, a citizen of the United States of America, have invented certain new and useful improvements in means or apparatus employed in coloring, printing, or producing colors or shades of colors or devices in or upon animal, vegetable, and mineral substances; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to color or print or produce colors or shades or devices some distance into the substance or body of the materials treated, or partly into and partly upon the substance or body of the material, whether such substances be of animal, vegetable, or mineral matter—such, for instance, as marble, stone, bone, ivory, wood, india-rubber, and many others.

In carrying out my invention I submit the substance or material desired to be colored, printed, marked, or treated to a dry or relatively dry heat in a closed vessel, from which radiation of such heat is prevented or sufficiently controlled, and after subjecting this substance to this heat until it has itself become of or about the same temperature—say of a little more than the temperature desired—(for instance, 100° Fahrenheit,) I allow vapor to flow into this chamber at a temperature slightly in excess of the article or goods to be treated, so that the atmosphere in the vessel may be charged therewith. The surrounding vapor is allowed to progressively increase in temperature, thus keeping the vapor somewhat above or slightly in excess of the temperature of the goods or articles being treated, which, taking their heat from the surrounding vapor, are necessarily cooler so long as the vapor continues to grow hotter. The requisite color, design, or matter destined to produce color or printing having been applied to the surface of the article, and the article subjected to the aforesaid dry-air treatment, the vapor is then brought to operate thereon, whereby such dye, color, printing, or design is subjected to a penetrative action, then set up, and is induced to sink or is carried or forced into the marble, ivory, or other substance under treatment to a considerable depth, and most useful and beautiful results are obtained. The difference of temperature between the object being treated and the surrounding vapor should not be such as to produce condensation, as such would be detrimental to the working of the process; but this difference is, on the contrary, generally only about 1° to 2°, even in some cases being as slight as one-tenth of a degree Fahrenheit—that is to say, so long as a difference of temperature or saturation around each object is maintained that condition is favorable to the penetrative action of the color or color-producing matter into the solid. The deposition or condensation of moisture is to be prevented by the preservation of the proper corelation of the temperature of the object treated and its surrounding vapor, as described.

The regulation, respectively, of the temperature of the object treated and the surrounding vapor is effected with the aid of thermometers placed in or adjoining the heated chamber, and radiation of heat is prevented by surrounding air chambers or cells, themselves receiving vapor of the same temperature as that surrounding and filling the holder or operating-chamber, while vapor is supplied by liquid supplied to and circulating in the lower part of or below the air-chambers and operating chamber or holder, capable of being shut off from communication with such operating-chamber during the dry-heating by valves or other closing means. The differential temperatures at the relative differences of heat requisite to maintain the action, as described, I have found no difficulty in maintaining at from about 100° to even about 200° Fahrenheit and higher.

By means of the color being induced to penetrate into substances treated to such a depth as is effected by this process, I am enabled to color, print, or otherwise produce designs, tints, and devices in the material, and then to remove, by abrasion, polishing, or otherwise, the surface or a portion or portions of the surface material without injury to the coloring, tint, device, or other markings desired to be retained in a finished article, either throughout the whole or portions of such finished article. Excess of color or colored designs, if present, may afterward be removed, leaving the desired design; or the excess may be allowed to remain. In practice, generally the object is to sink all of the colors below the surface of the material treated. In some instances I employ colors or agents that will under treatment generate colors—as soluble salts of iron—not yellow, *per se*, yet producing yellow throughout for variegated marbles.

In carrying out these improvements I provide an inner vessel, of copper or galvanized wrought-iron or other suitable material, having free open communication with water contained in the lower part of this chamber, but readily capable of being separated from communication with such liquid, when required, by means of valves or cocks or other closing means at will by means of suitable gear from the exterior. This inner chamber is surrounded all round its sides and top by two or more air chambers or cells, each chamber sealed off from the next chamber by its walls dipping into water contained in a trough or tray supporting them, provision being made by openings below the level of the water for its circulation over that trough's surface. Beneath this trough is a water bath or chamber supplied with water or other liquid to be heated, and below this water-chamber again are jets of gas or other suitable heating means regulated by suitable valves with indicators. Suitable curtains of metal or other suitable material may be used to protect the flames and confine the heat, as required.

In place of water alone, a mixture of ammonia or alcohol with water may under some circumstances be employed in the lower part of the chamber, and the vapor arising would then be charged with ammonia or alcohol, or the vapor arising from the water may be mixed with chlorine gas or oxygen gas, where the action of those gases on the articles under treatment would be beneficial to the result.

Thermometers placed in communication with the air-chamber next adjoining the inner chamber and in the water-chamber below indicate the temperatures respectively therein, and admit of the delicate adjustments requisite for the success of the operations. Suitable non-conducting walls or surrounding materials cover the whole.

The inner chamber for containing the objects to be treated is constructed so as to be capable of being conveyed or run into and drawn out through doors or removable portions of the surrounding air-chambers, so as to be more readily filled with and emptied of the objects to be treated or colored, in the manner described, by means of wheels attached to its bottom, running on a movable tramway, or by other suitable devices well understood. This facility for removal of the inner holder for ivory and such like valuable goods will be found very convenient in practice, particularly in continuous working, where one inner chamber may be in operation within while another chamber is being prepared; and, further, the danger of the moisture of the atmosphere of the interior cells or air-chambers becoming condensed on the opening of the doors and of falling on the goods within the inner chamber is averted, the said inner chamber being closed by the closing of the floor-valves before withdrawal.

The operating-chamber may be inserted and removed by the same entrance, or entrance and exit may be arranged at opposite sides of the apparatus.

In operation with this apparatus, the rate of increase at which I find the relative temperatures of the vapor and the articles being treated should rise, and the time for which such temperatures should be maintained, depends on the nature of the material and the thickness of the articles. For instance, a thick piece of marble, ivory, or other substance will require a considerably slower rate of increase per hour than would be satisfactory for a thin sheet or piece of the same material. The heat must be allowed greater time to penetrate the greater thickness or substance, and the rate of increase of temperature must be correspondingly lessened. For instance, while for some thin or quickly-penetrable substances (as respects the color) a rate of differential increase, respectively of the vapor and the articles, of, say 30° Fahrenheit per hour, may be advisable, and give good results. On the contrary, for much thicker bodies, a correspondingly differential increase of one-tenth of a degree per hour may be as fast a rise as may safely be permitted, regard being had to the avoidance of condensation of moisture on the goods being treated. Thus, for pieces of ivory of one-fourth of an inch in thickness, I have found, to give a satisfactory result when thus treated at a relative increase of 5° Fahrenheit per hour, the coloring-matter employed being, say, one of the ordinary aniline colors, and when employing as a coloring-matter sulphate of iron, and operating therewith on the surface of a piece of marble of an inch in thickness, say, starting at a temperature of 130°, at the rate of increase of temperature of 1° to 2° per hour, that, after about eighteen hours' treatment, such as described, good results were attained.

In the drawings, Figure 1 shows a longitudinal section of the apparatus; Fig. 2, a transverse sectional view of one-half of the same divided on the line $x\,x$ of Fig. 3. Fig. 3 is a horizontal section of the apparatus. Figs. 5, 6, 7, 8, and 9 show parts separately.

$a$ is the operating-chamber for containing the articles treated. This chamber is mounted on wheels $a^5$ to run on reels $a^6$, provided within this chamber $a$, and thence onto other rails (not shown) turned down or run to meet these rails $a^6$, when the chamber $a$ is rolled on the wheels $a^5$ out of the chamber $b$ and through the chamber $c$ by way of the openings left by swinging aside the doors $b^2$ and $c^2$, which close the entrances to those air-cells or heat-retaining chambers $b$ $c$. This operating-chamber $a$ is provided with a door, $a^2$, shown to open in two leaves on hinges, $a^7$, for access to the interior. The bottom of this chamber $a$ is formed with openings therein, $a^8$, such openings being closed or left free or partly free by the sliding over them of a similarly perforated plate, $a^9$, operated by a screw, $a^{11}$, and winch $a^{10}$, such screw $a^{11}$ taking into a thread at $a^{12}$ in the frame at the bottom of the chamber $a$, the coincidence of the openings giving free passage into the chamber $a$ and the super-position of the solid parts of the plate $a^9$ upon the openings $a^8$ closing the same. The walls $b^3$ of the chamber $b$ rest on the bottom of the chamber $c$, and the bottom of these chambers $b$ and $c$ are supplied with liquid, which can circulate freely over the entire surface of those chambers through the openings $c^3$ therein.

$d$ is a double wall, filled in or lagged with hair or other suitable non-conducting material to retain the heat.

$e$ is a water bath or chamber, supplied with water or other liquid by means of an inlet-pipe, $i$, and outlet $j$.

$g$ are gas-burners supplied by pipes $g$, for heating the water bath $e$. It will be found that when the water bath has been sufficiently heated with all the burners, the slower increase of heat subsequently desired may be maintained by a few only of the burners, the others being by suitable cocks (not shown) turned off or lowered, as the case may require.

The water or other liquid to the bottom of the chambers $b$ and $c$ may be supplied by a channel from water bath $e$, controlled by a tap or cock operated from the exterior of the apparatus, or this liquid may be otherwise supplied—say by means of inlet and outlet pipes $i$ and $k$.

In operation the holder or operating-chamber $a$, having been run out and opened, is filled up, as desired, with the articles to be treated, and is then closed by shutting the doors $a^2$, and valves $a^9$ of the floor $a^8$ thereof run into the chamber $b$ on the rails $a^6$, the doors $b^2$ and $c^2$ being closed after removal of the rails connecting the rails $a^6$ with those traversing the works, and the heat applied to the water bath $e$ extending to and heating the liquid in the chamber $b$ $c$, and thence transmitting its heat to the inner chamber or holder, $a$, producing a comparatively-dry heat therein, as already described, and this is continued for a time. Then the floor-valve $a^9$ is moved, so as to open the passages $a^8$, letting in vapor to that chamber $a$. The operator, now, by careful attention to the indications of the thermometers $h$ and $h^2$, is enabled to so adjust the relative temperatures of the water bath and holder that, guided by those indications and the nature and thickness of the material under treatment, the proper adjustment of the contained atmosphere may be maintained with the gradual rise of temperature.

Gages and valves (not shown) are employed (such as are usually used where adjustment of pressure is necessary) to control the supply of the gas to the burners $g$.

Having thus described the nature of the invention and the manner of carrying the same into effect, I wish it understood that what I claim is—

1. The combination, in apparatus for use in the process of coloring or producing color or designs in or upon animal, vegetable, or mineral substances, according to the process described, consisting of a removable operating holder or chamber, $a$, for containing the articles treated, provided with valves, a heat-retaining chamber, $b$, with one or more surrounding air cells or chambers, $c$, and packed non-conducting shell or casing $d$, said air-chambers containing liquid for generating vapor, and a water bath, with heating appliances and regulating means thereto, constructed or arranged and operated substantially as described and shown.

2. In combination, a removable holder, $a$, air cells or chambers, and the shell $d$, surrounding said holder, as shown and described, and means for maintaining the desired differential temperature between the article under treatment and the vapor surrounding it, all substantially as set forth.

3. In an apparatus for use in the process of coloring or producing color or designs in or upon animal, vegetable, or mineral substances, the combination of two or more inclosing-walls surrounding a removable holder or operating-chamber, provided with a valve composed of a perforated plate, $a^9$, arranged to be slid and adjusted to any desired position on a correspondingly-perforated bottom of holder $a$, to control the supply of vapor admitted to such holder, all substantially as set forth.

In testimony whereof I affix my signature in in the presence of two witnesses.

GEORGE HAND SMITH.

Witnesses:
ALFRED DONNISON,
ALFRED GEORGE BROOKES.